July 5, 1932.  W. FERRIS  1,866,348
MILLING MACHINE
Filed June 20, 1927   5 Sheets-Sheet 1

INVENTOR.
WALTER FERRIS
BY
ATTORNEY.

July 5, 1932.  W. FERRIS  1,866,348

MILLING MACHINE

Filed June 20, 1927   5 Sheets-Sheet 5

INVENTOR.

WALTER FERRIS

BY

ATTORNEY.

Patented July 5, 1932

1,866,348

UNITED STATES PATENT OFFICE

WALTER FERRIS, OF MILWAUKEE, WISCONSIN, ASSIGNOR TO THE OILGEAR COMPANY, OF MILWAUKEE, WISCONSIN, A CORPORATION OF WISCONSIN

MILLING MACHINE

Application filed June 20, 1927. Serial No. 199,936.

This invention relates primarily to milling machines, and particularly to table drives therefor, although certain novel features of the present invention may be advantageously applied to machines of various other types.

One object of the present invention is the provision of a hydraulic drive for a milling machine table so designed as to effect a steady feed motion irrespective of the character or direction of the reaction between the cutter and work. In a mechanically fed milling machine it is impracticable to drive the cutter in such direction as to cut in the direction of table movement, on account of the inherent backlash in a mechanical drive, which permits the table to jump ahead of its normal feed motion, under the pull of the cutter. To avoid this jumping tendency in a mechanically fed milling machine the cutter is invariably driven in such direction as to cut against or crosswise of the direction of table movement. In a milling machine fed by a hydraulic drive embodying the present invention the cutter may be driven so as to cut in the direction of table movement.

Another object of the present invention is the provision of an improved hydraulic drive for milling machines and the like automatically operable to effect abrupt changes in the rate of travel of the driven part at predetermined points in the path of travel thereof.

Another object is the provision in a hydraulic drive for reciprocating tables and the like of improved means for effecting an automatic reversal thereof.

Another object is the provision in a hydraulic drive for the reciprocating part of a machine tool or the like of improved means for effecting an automatic reversal thereof and for effecting abrupt changes in the rate of travel thereof at predetermined points in the path of travel in both directions of motion.

Another object is the provision of a control mechanism for a driven reciprocating part automatically operable to effect reversal of said part at both ends of the stroke and to arrest the movement thereof at a point intermediate the ends of the stroke.

Another object is the provision of a control mechanism for a driven reciprocating part automatically operable to effect reversal of said part at both ends of the stroke, to vary the rate of travel thereof at predetermined points in both directions of operation, and to arrest the movement thereof at predetermined intermediate points.

Other objects and advantages will appear from the following description of an illustrative embodiment of the present invention.

The milling machine selected for illustration includes a base frame 10 having a rigid column 11 rising therefrom. The usual cutter spindle 12 is carried by a head 13 of a well known type mounted for vertical adjustment upon the column 11. The spindle 12 is driven in a well known manner from a shaft 14 through appropriate gear sets housed within the head 13 and frame 10, respectively, and connected by the usual splined shaft 15 designed to permit vertical adjustment of the head relative to the frame. In this instance the shaft 14 is driven through a belt and pulley connection 16 from an electric motor 17 mounted upon an extension 18 of the base frame.

The usual work supporting table 19 is mounted for lengthwise travel within the usual ways 20 formed in the top of the frame 10 in front of the column 11 and beneath the cutter spindle 12. The table is hydraulically actuated by mechanism designed to effect either rapid or slow motion thereof in either direction and to effect a quick change from one speed or direction to another at any selected point or points within the range of travel. In the machine shown two parallel motor cylinders 21 and 22 of different diameters are employed, both being anchored within the frame 10, and each containing a double acting piston 23 or 23' connected to the opposite ends of the table 19 through rods 24 or 25 and brackets 26 fixed to the table ends. The cylinders are preferably disposed one above the other beneath the central longitudinal axis of the table, and to facilitate assembly within the frame 10, the cylinders are preferably joined as a unit. The upper or larger cylinder 21 carries two end brackets 27 cast integral therewith and bored to receive the ends of the smaller cylinder 22 having a pressed fit therein. The ends of the smaller cylinder are closed by appropriate end heads 28 removably fixed within the brackets 27, the large cylinder being closed by similar heads 29 removably fixed therein.

Figure 3:
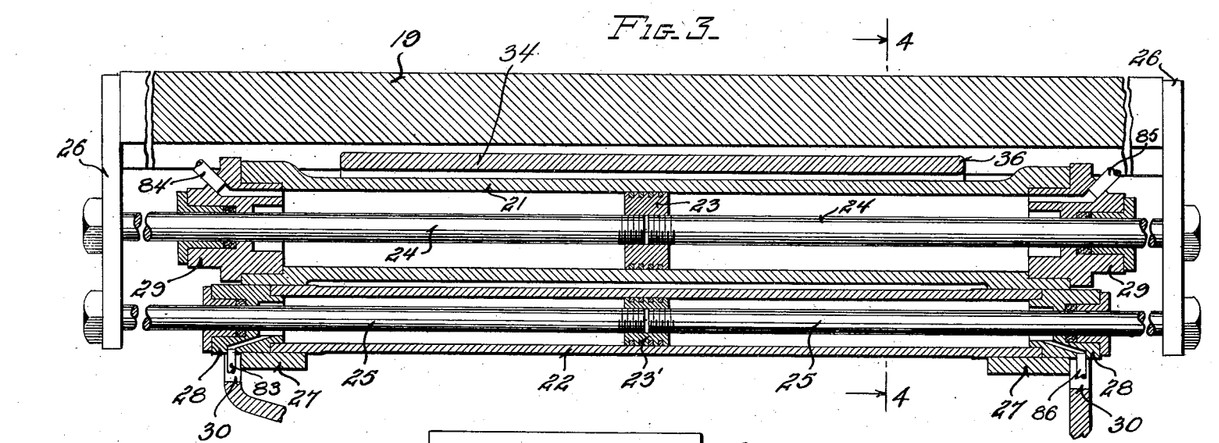
Fig. 3 is a sectional view, on a larger scale, taken substantially along the line 3—3 of Figure 2.
Figure 4:
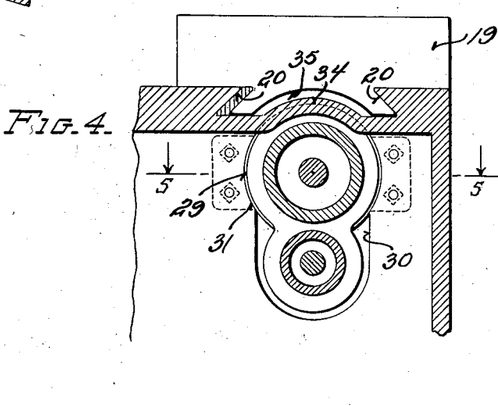
Fig. 4 is a sectional view taken substantially along the line 4—4 of Figure 3.
Figure 5:
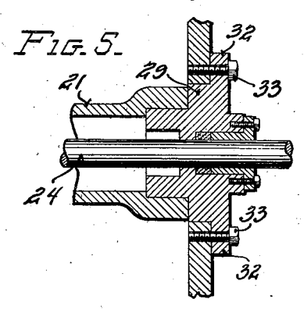
Fig. 5 is a sectional view taken substantially along the line 5—5 of Figure 4.

The opposite ends of the base frame 10 are formed with openings 30 to accommodate the cylinders and through one of which the cylinders are inserted lengthwise into the frame. Each opening is formed with an enlarged portion 31 curved to fit an end head 29 to thereby provide an appropriate seat for positioning and supporting the same. One of the heads 29 is provided with lateral plate-like lugs 32 adapted to abut the external face of the base frame when the cylinders are fully inserted into the frame, these lugs being removably secured to the frame by appropriate means such as screws 33 to thereby securely anchor the cylinders against end movement. The frame is formed with an integral deck 34 overlying the upper cylinder and spanning the gap between the ways 20 to thereby securely retain the ways against spreading. The deck 34 is preferably of arched form the bottom of the table being somewhat curved as at 35 to accommodate the same in order to effect a close association of the cylinders with the table. It will be noted from Figure 3 that the ends of the deck are cut away at 36 to accommodate the enlarged ends of the upper cylinder.

Figures 2, 13:
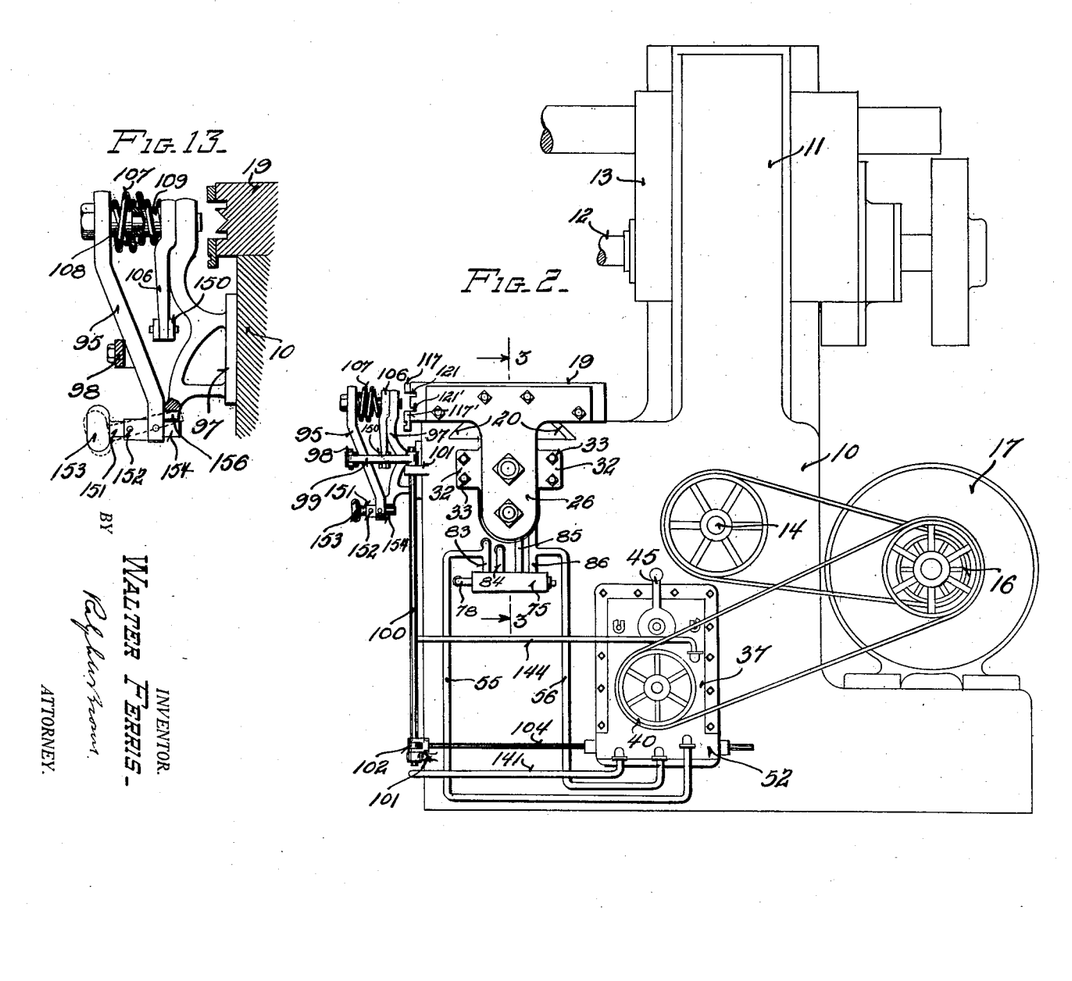
Fig. 2 is a side elevation.
Fig. 13 is an elevational view, on a larger scale, of a part of the control mechanism shown in Figures 1 and 2.

Driving liquid is supplied to the motor cylinders 22 and 21 at an accurately measured rate to thereby effect operation of the table at any selected speed and at a substantially steady rate irrespective of variations in resistance resulting from reactions between the cutter and work. With a mechanically operated milling machine table it is impracticable to feed the table in the direction of the cutting action because of the inherent back lash in mechanical drives and the tendency of the table to jump ahead of its normal feed motion under the pull of the cutter. The hydraulic drive of the present invention is designed to prevent table jump and to thereby permit the table to advance in the direction of the cut. In the machine shown the hydraulic drive includes a positive flow variable delivery pump mechanism 37 (Fig. 2) of a well known type, directly connectable to the cylinders and serving as an accurate metering device for the liquid delivered to the cylinders. The pump mechanism herein shown is fully described in the copending application of John P. Ferris, Serial No. 199,925 filed June 20, 1927. It will suffice here to say that this pump mechanism includes two pump units, namely:—a variable displacement positive delivery pump unit 38 (Fig. 6), and a constant displacement gear pump unit 39 of a well known type, both driven at constant speed through a belt and pulley connection 40 from the motor 17. The displacement of the pump unit 38 is regulated by adjustment of a rock arm 41, pivotally supported at 42 and normally controlled by a cam 43 coacting with a roller 44. The cam 43 is actuated and controlled by a hand lever 45 through a stem 46 and gearing 47. The arrangement is such that the pump unit 38 normally delivers liquid into pipe 48 at a definite rate determined by the setting of the cam 43 and receives liquid at a corresponding rate through a return pipe 49. The arm 41 is further adjustable to effect an abrupt increase in pump displacement by the action of a fluid actuated plunger 50. The plunger 50 is actuated by fluid pressure supplied through a pipe 51 under control of a valve 52 to be hereinafter described. The gear pump 39 receives liquid from an appropriate reservoir (not shown) through a pipe 53 and discharges into a pipe 54 in open communication with the return pipe 49, so that the return pipe and associated parts are maintained flooded with liquid under pressure. The pressure thus maintained in pipes 54 and 49 is determined by the adjustment of a pressure relief valve 54' of a well known type connected to the pipe 54. This pump mechanism also includes a main distributing valve 52, hereinabove mentioned, which controls communication between pipes 48 and 49 and pipes 55 and 56 constituting two sides of a closed hydraulic circuit of which the cylinders 22 and 21 form a part.

The main distributing valve 52 is shown in detail in Figures 6 to 10. It contains a longitudinal bore 57 and two end chambers 58 and 59. Five annular grooves 60, 61, 62, 63 and 64 are formed in the wall of the bore 57. Groove 60 communicates with pipe 51, groove 61 with a drain pipe 65, groove 62 with pipe 55, groove 63 with pipe 48, and groove 64 with pipe 56. A plunger 66, within the bore 57, is formed with an end head 67, which controls communication between groove 60 and end chamber 58, an intermediate head 68, which controls the groove 63, and an end head 69, which controls communication between groove 64 and end chamber 59. The plunger 66 contains a longitudinal passage 70 through which communication is maintained between the end chambers 58 and 59, and both end chambers are thus open to the return pipe 49 which is directly connected to chamber 59. Radial passages 71 in the head 68 communicate with the longitudinal passage 70. An annular chamber 72, formed in the wall of the bore 57 intermediate the grooves 61 and 62, is controlled by a head 73 formed on the plunger 66. Head 73 is provided with radial passages 74 which communicate with the longitudinal passage 70.

Figure 6:
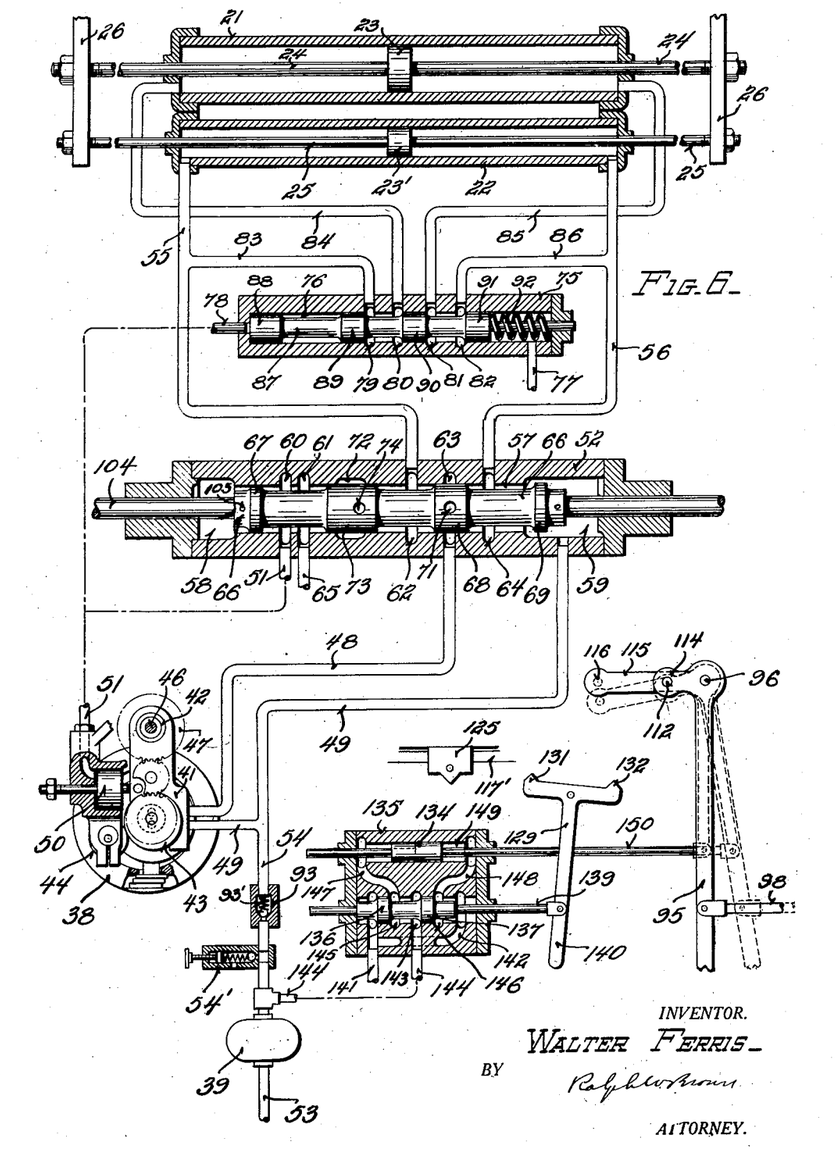
Fig. 6 is a diagram of the hydraulic circuit.

The arrangement is such that when the plunger 66 of the valve 52 is in the intermediate position of Figure 6 pipe 48, leading from the pump unit 38, communicates with the return pipe 49 through the groove 63, radial passages 71, longitudinal passage 70, and end chamber 59, so that the pump circuit is bypassed; pipe 56 is open to the return pipe 49 through groove 64 and end chamber 59, so that the motor circuit is exposed to the gear pump pressure in pipe 49; but the pipe 55 is open to the dead space between the heads 73 and 68, so that this pipe is effectively blocked and the pistons 23 and 23' are at rest. In this position of the valve 52 pipe 51 is open to the drain pipe 65 so that plunger 50 is retracted and the pump unit delivers liquid into the pipe 48 at a rate determined by the setting of the cam 43.

Figure 7:
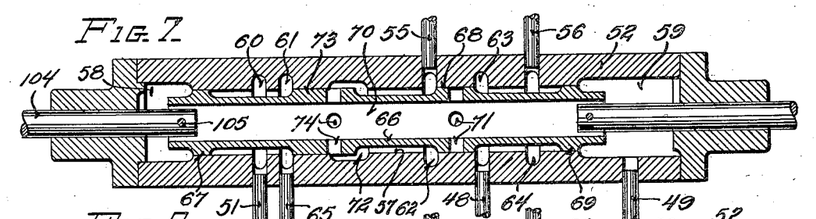
Figs. 7 to 10 are longitudinal sectional views of the main distributing valve shown in Figure 6, illustrating several characteristic positions thereof.
Figure 8:
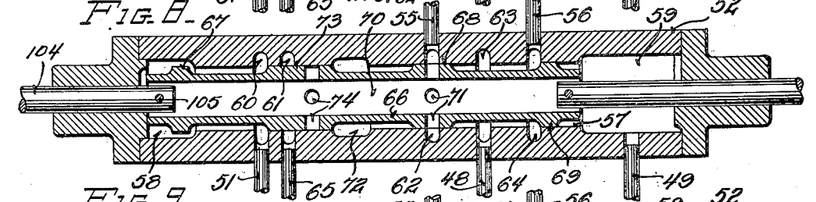

When the plunger 66 of the valve is shifted toward the left into the position of Figure 7, head 69 blocks communication between pipe 56 and end chamber 59, and pipe 48 is connected with pipe 56, so that the entire discharge from the pump unit 38 is directed into the pipe 56. In this position of the valve pipe 55 is connected with return pipe 49 through the groove 62, chamber 72, radial passages 74, longitudinal passage 70, and end chamber 59. Also pipe 51 remains open to the drain pipe 65 so that the plunger 50 is still retracted. When the plunger 66 is shifted further toward the left into the position of Figure 8, pipe 48 remains connected with pipe 56 and pipe 55 is connected with return pipe 54', through radial passages 71, longitudinal passage 70 and end chamber 59, but drain pipe 65 is blocked and pipe 51 is exposed to the gear pump pressure in the end chamber 58, so that the plunger 50 is advanced to thereby effect an immediate increase in the displacement of the pump unit 38. This pump unit then delivers liquid at an increased rate through pipe 48 to pipe 56 and receives liquid at a corresponding rate from pipe 55 through pipe 49.

Figure 9:
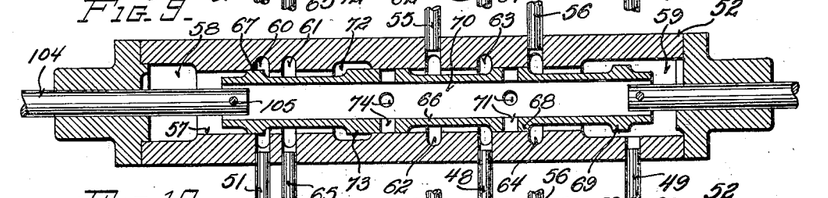

When the plunger 66 of the valve 52 is shifted toward the right into the position of Figure 9, pipe 48 is connected with pipe 55, and pipe 56 is connected with return pipe 49 through the end chamber 59, to thereby reverse the flow in the motor circuit. In this position of the valve pipe 51 is again opened to the drain pipe 65 and plunger 50 is retracted so that the pump unit 38 again delivers liquid at the slower rate determined by the setting of the cam 43. When the plunger 66 is shifted further to the right into the position of Figure 10, pipe 48 remains connected with pipe 55 and pipe 56 with return pipe 49 through radial passages 71, longitudinal passage 70, and end chamber 59, but pipe 51 is then reexposed to the pressure in end chamber 59 and the plunger 50 is again advanced to increase the displacement of the pump unit 38.

It will thus be understood that, by adjusting the valve 52 into any of the four positions shown in Figures 7 to 10, liquid in the motor circuit may be caused to flow in either direction at either of two predetermined rates, and that with the valve in a fifth or neutral position of Figure 6 the motor circuit is effectively blocked.

In the machine shown pipes 55 and 56 are permanently connected to the opposite ends of the smaller cylinder 22. The opposite ends of the larger cylinder 21 are connectable to the pipes 55 and 56, respectively, through an appropriate selective valve 75 preferably automatically controlled in a manner to be later described. In this instance the valve 75 is in the form of a block containing a longitudinal bore 76. One end of the bore is open to a drain pipe 77 while the other end is open to a pipe 78 connected with the pipe 51 hereinabove mentioned. Four annular grooves 79, 80, 81 and 82 are formed in the wall of the bore 76. Groove 79 communicates with pipe 55 through a pipe 83; groove 80 communicates with a pipe 84 leading to the left end of cylinder 22; groove 81 communicates with a pipe 85 leading to the right end of cylinder 22; and groove 82 communicates with pipe 56 through a pipe 86. A plunger 87 having four spaced heads 88, 89, 90 and 91 is fitted for lengthwise reciprocation within the bore 76. A spring 92 yieldably retains the plunger 87 in the position shown in Figure 6, in which position head 90 blocks communication between grooves 80 and 81, while groove 79 is open to groove 80 and groove 81 is open to groove 82. The opposite ends of the cylinder 21 are thus open to the pipes 55 and 56, respectively, through the pipes 83 and 84 and the pipes 85 and 86. Whenever the pipe 51 is exposed to pressure by adjusting the plunger 66 of the main distributing valve into either of the extreme positions shown in Figures 8 or 10, this pressure is transmitted through pipe 78 to the left end of the valve 75 thereby shifting the plunger 87 of this valve toward the right, against the pressure of the spring 92, into the position shown in Figure 11. With the valve in this position pipes 83 and 86 are blocked by the dead spaces between the heads 88 and 89 and the heads 90 and 91, and communication is established between the pipes 84 and 85 to thereby place the opposite ends of the cylinder 21 in open communication.

It will thus be noted that when the plunger 66 of the main valve 52 is shifted into either of the two positions shown in Figures 7 and 9, the valve 75 remains in the normal position of figure 6 and both cylinders 22 and 21 are open to the motor circuit, and the liquid supplied at a definite rate through pipe 48 is received by both cylinders, thereby causing the pistons 23 and 23', and the milling machine table 19, to travel at a relatively slow rate in one direction or the other dependent upon which direction the plunger 66 has been shifted from neutral position. When the plunger 66 is shifted into either extreme position shown in Figures 8 or 10, the plunger 87 of valve 75 is shifted into the position shown in Figure 11, thereby disconnecting the cylinder 21 from the motor circuit, so that the entire flow through the pipe 48 is directed into the smaller cylinder 23, thereby causing the piston 23' and table 19 to travel at a relatively high rate in one direction or the other. Under this condition the large cylinder 21 offers no appreciable resistance to this rapid travel of the table by virtue of the fact that the opposite ends thereof are open to each other through the pipes 84 and 85. It will also be noted that this increased speed is due not alone to the removal of the large cylinder 21 from the circuit but also due to the simultaneous increase in the rate of flow in the pipe 48, effected by the action of the plunger 50 upon the variable displacement pump unit 38 hereinabove mentioned.

It will also be noted from the foregoing description and an inspection of the circuit diagram of Figure 6 that the return side of the motor circuit is maintained flooded with liquid under pressure under all conditions of operation. Thus, when the delivery pipe 48 is open to the pipe 55, driving liquid is supplied at a predetermined rate to the left end or ends of the cylinder or cylinders to drive the table toward the right, while liquid is forced from the other end or ends of the cylinder or cylinders through the pipe 56 and into the return pipe 49 against the pressure maintained therein by the discharge of the gear pump 39 into the pipe 49. And when the table is traveling toward the left under the action of the driving liquid supplied through pipes 48 and 56, liquid from the left end or ends of the cylinder or cylinders is forced through pipe 55 into the return pipe 49 against this gear pump pressure. By proper adjustment of the relief valve 54' this back pressure may be maintained sufficiently high to effectively overcome any tendency of the table to jump ahead of its normal feed motion. A milling machine table driven by a hydraulic circuit, such as herein described, may thus be fed in the direction of the cutting action without danger of causing table jump. As a further safeguard against table jump the hydraulic system shown in Figure 6 includes a check valve 93, interposed within the pipe 54 between the relief valve 54' and the pipe 49, so as to permit a free flow of liquid through pipe 54 to pipe 49, to maintain the main circuit flooded in the manner hereinabove described, but automatically operable to block pipe 54 against flow in the opposite direction, and thereby prevent the escape of liquid from pipe 49 to pipe 54. In order to retain the valve close to its seat and thereby insure a prompt closure thereof upon any tendency toward reversal of flow in the pipe 54, the valve is preferably spring loaded as indicated at 93'. The arrangement is such that, if the back pressure, normally maintained by the pump 39 and relief valve 54'; be at any time insufficient to overcome the forces tending to produce table jump, the check valve 93 closes instantly and the solid column of liquid thus confined within the pipe 49 acts as a positive check against table jump.

In the machine shown the main distributing valve 52 is placed under the control of the table through mechanism designed to automatically reverse the table at each end of its stroke, to effect a slow motion during each cutting portion of its stroke, and to effect a relatively rapid motion during each idle portion of its stroke. The arrangement shown is such that, while the table is being slowly advanced with the cutter operating upon a work piece at one end of the table, a finished work piece at the other end of the table may be removed and replaced by a fresh work piece in position to be operated upon by the cutter, during the next stroke of the table in the other direction, and vice versa. Provision is also made in the control mechanism shown for automatically arresting the motion of the table at an intermediate point in each stroke in order to allow ample time to complete the reloading operation in the event that the time required to complete each cutting operation is less than that required for reloading.

The control mechanism shown includes a lever 95, rockably supported upon a stud 96, fixed in an appropriate bracket 97, secured to the front of the base frame 10 adjacent the table 19. A link 98 connects lever 95 with an arm 99, fixed to a vertical rock shaft 100, journaled in lugs 101 projecting from the frame 10. A second arm 102, fixed to the rock shaft 100, is connected with a stem 104, fixed at 105 to the plunger 66 of the control valve 52. A second lever 106 is rockably supported upon the stud 96 and yieldably connected to the lever 95 so as to normally swing as a unit therewith. In this instance the connection between the levers 95 and 106 comprises a heavy coiled spring 107, loosely disposed about the hubs 108 and 109 of the levers with its ends 110 and 111 disposed above and below two adjacent pins 112 and 113 carried by the levers (see Figs. 13 and 14). Pin 112 is rigidly anchored in an extension 114 of lever 95 and pin 113 is rigidly anchored in the arm 115 of lever 106. Both pins are thus confined between the ends of the spring and are thus yieldably retained thereby against relative displacement, so that the two levers normally function as one.

The arm 115 of lever 106 carries a pin 116 arranged to coact with appropriate cams carried by the table 19. In the machine shown the front edge of the table 19 carries two vertically spaced rails 117 and 117' extending lengthwise thereof. A cam plate 119 having a bevelled end 120 is removably disposed immediately below the upper rail 117 for adjustment lengthwise thereof. In this instance the plate 119 is seated within a longitudinal groove 121 formed in the front edge of the table and clamped in position by appropriate means such as a screw 122. A second cam element 123 having an inclined face 124 is similarly mounted within the slot 121 beneath the rail 117. Similar cam elements 119' and 123' are removably and adjustably fixed in a similar groove 121' disposed immediately above the lower rail 117'.

Provision is made for yieldably urging the arm 115 of the lever 106 upwardly during movement of the table toward the left so that pin 116 then follows the upper rail 117 and associated cams 119 and 123, and for urging the arm 115 downwardly during movement of the table toward the right so that pin 116 then follows the lower rail 117' and associated cams 119' and 123'. This is accomplished in this instance by mechanism which will now be described. This mechanism includes two detents 125 and 126 each removably clamped to the lower rail 117' for adjustment lengthwise thereof. A dog 129, rockably supported upon a fixed stud 130, is formed with two upturned, wedge-shaped ends 131 and 132 for coaction with the detents 125 and 126. The arrangement is such that when detent 126 strikes the end 132 of the dog 129, during table movement toward the left, end 132 is depressed and the dog is rocked from the position of Figure 1, into the position of Figure 6; and similarly when the detent 125 strikes the end 131, during table movement toward the right the dog is rocked from the position shown in Figure 6 to that of Figure 1.

The dog 129 controls an appropriate valve plunger 133, which in turn controls a fluid actuated piston 134 by which the lever 106 is urged in one direction or the other. In this instance the valve and piston are housed within a block 135 fixed to the front of the machine. The valve plunger shown is formed with two spaced heads 136 and 137 closely fitted for reciprocation within a bore 138 formed in the block 135. The plunger is connected through a stem 139 with the tail 140 of dog 129. The opposite ends of the bore 138 are in open communication with each other and with a drain pipe 141 through a passage 142. An intermediate annular groove 143 formed in the bore is maintained flooded with liquid under pressure through a pipe 144, which communicates with the pipe 54 into which the gear pump 39 discharges. Two similar grooves 145 and 146, controlled by the heads 136 and 137 of the valve plunger, communicate, respectively, through passages 147 and 148, with the opposite ends of a bore 149 containing the piston 134. The piston 134 is connected through a link 150 with the depending arm of lever 106. The arrangement is such that when the dog 129 assumes the position shown in Figure 1, the valve plunger 133 assumes the position shown in Figure 15, so that the left end of bore 149 is open to the drain pipe 141, and the right end of the bore 149 is exposed to the pressure in groove 143. The piston 134 is thus urged toward the left from the full line toward the dotted line position of Figure 15, and the arm 115 of lever 106 is urged upwardly. When the dog 129 is shifted into the position shown in Figure 6, the valve plunger 133 is shifted into the position of Figure 6, thereby opening the right end of bore 149 to the drain pipe 141 through passage 142 and exposing the left end of the bore 149 to the pressure in groove 143. The piston 134 is then urged toward the right from the full line toward the dotted line position of Figure 6, and the arm 115 of lever 106 is urged downwardly.

A brief description of the operation of the machine will now be given. Let it be assumed that the table 19 is in intermediate position, that the dog 129 is in the position shown in Figure 1, and that the motor 17 is operating to drive the cutter spindle 12 and the pump mechanism 37. Both pump units 38 and 39 are thus operating, unit 38 delivering liquid into pipe 48 at a measured rate, determined by the setting of the cam 43, and unit 39 maintaining a predetermined pressure in pipes 54 and 49. It will be noted that with the table 19 and dog 129 in this position, pin 116 of the lever 106 is held against the cam element 123 by the fluid pressure in the right end of the bore 149, so that the pin 116 is midway between the rails 117 and 117′. The levers 106 and 95 are thus in intermediate position and the plunger 66 of the main valve 52 is in the neutral position shown in Figure 6, so that the flow in pipe 48 from pump unit 38 is directed through pipe 49 back to the pump, and so that pipe 55 is blocked and the pistons 23 and 23′ and the table are at rest.

Figures 1, 12, 14, 15:
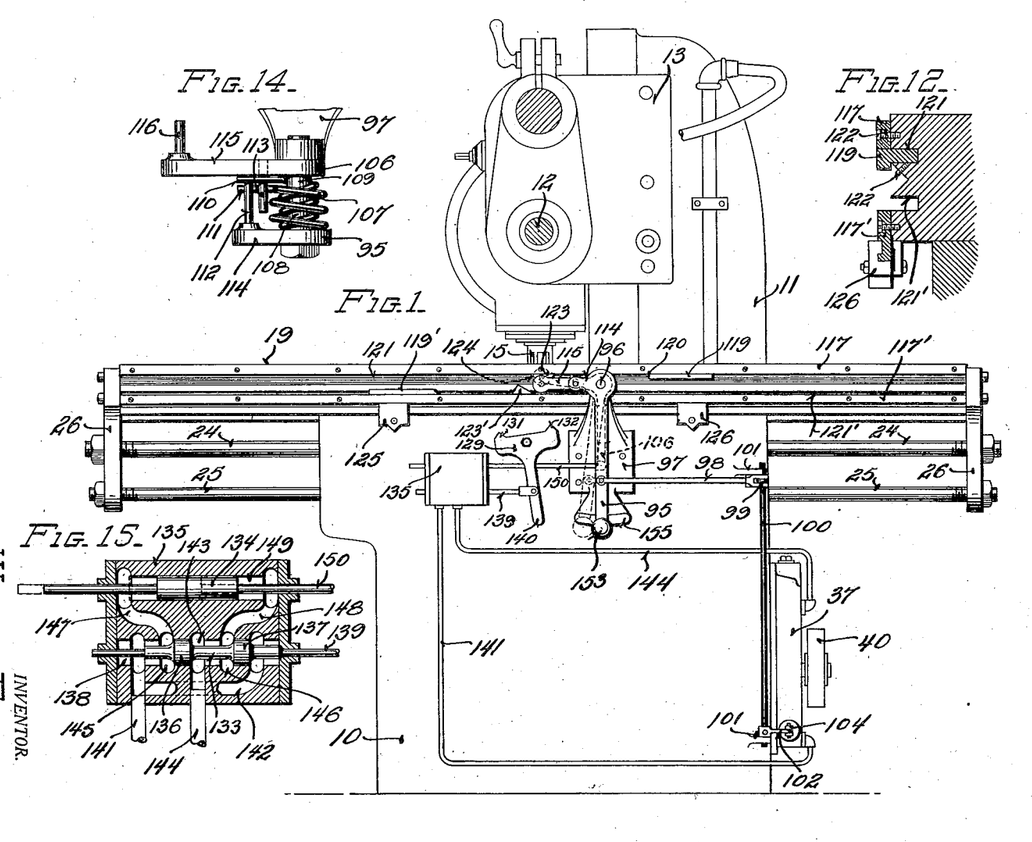
Figure 1 is a front elevation of a milling machine embodying the improved features of the present invention.
Fig. 12 is a vertical section through the front of the table, on a larger scale.
Fig. 14 is a top plan view of the mechanism shown in Figure 13.
Fig. 15 is a section view of valve and associated piston constituting another part of the control mechanism.

To start the table the lever 95 is swung by hand toward the left into the dotted line position of Figure 1, the spring connection 107 between the levers 106 and 95 permitting this movement. This movement of the lever 95 is transmitted to the plunger 66 of valve 52, through the link 98 and rock shaft 100, thereby shifting this plunger 66 toward the left into the position shown in Figure 8. Pipe 56 is thus opened to delivery pipe 48, pipe 55 is opened to return pipe 49. Also pipe 51 is exposed to pressure, so that the plunger 50 is actuated to increase the displacement of pump unit 38 and the plunger 87 of valve 75 is shifted into the position shown in Figure 11, thereby disconnecting the large cylinder 21 from the motor circuit, and directing the entire flow of liquid in pipe 56 to the right end of the small cylinder 22, causing the table 19 to travel rapidly toward the left. This causes the pin 116 to pass over the cam 123 and thereafter to follow the rail 117, the lever 106 thus reassuming its normal relation with the hand lever 95.

The table continues this rapid travel toward the left until the pin 116 reaches the cam 119 and is depressed by the action of the bevelled end 120 of the cam. When this occurs the arm 115 of lever 106 is depressed, thereby swinging the lever 95 slightly toward the right and shifting the plunger 66 of the valve 52 into the position shown in Figure 7. The pipe 51 is thus opened to the drain pipe 65 so that plunger 50 is retracted with a consequent reduction in pump displacement and the flow in pipes 48 and 56 is reduced to that determined by the cam 43. Simultaneously the plunger 87 of valve 75 assumes the position shown in Figure 6, and the flow through pipe 56 is directed to both cylinders. The table 19 thus continues to travel toward the left but at a greatly reduced rate, suitable for a cutting feed. The cam 119 is so positioned as to effect this reduction in the rate of table movement immediately prior to the point at which a work piece is engaged with the cutter.

The table continues to travel at this reduced rate until the cutting action on that particular work piece is completed, at which time the detent 126 strikes the end 132 of the dog 129 and rocks the same into the position shown in Figure 6. This results in a shifting of the valve plunger 133 into the position shown in Figure 6, and thereby exposing the left end of bore 149 to the pressure in pipe 144, causing the piston 134 to shift toward the right and to swing the levers 106 and 95 into the dotted line position of Figure 6. This action of these levers shifts the pin 116 into contact with the lower rail 117′, and the plunger 66 of valve 52 into the position shown in Figure 10. Delivery pipe 48 is thus connected to pipe 55 and pipe 56 to return pipe 49, so that the motor circuit is reversed. In this position of plunger 66 pipe 51 is again exposed to pressure so that pump displacement is increased and the plunger 87 of valve 75 is shifted into the position of Figure 11, thereby again disconnecting the cylinder 21 from the motor circuit. The table 19 then travels toward the right at high speed, until the pin 116, following the lower rail 117′, comes in contact with the cam 123′ and is lifted thereby into intermediate position. This action returns the plunger 66 of valve 52 into the neutral position of Figure 6 and the table 19 comes to rest.

Figure 10:
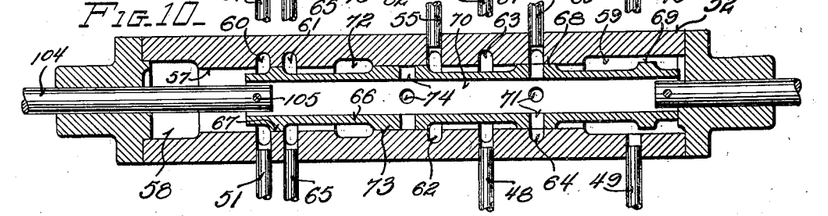
Figure 11:
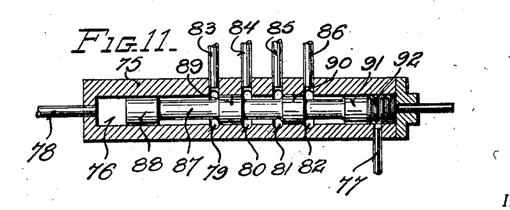
Fig. 11 is a similar view of the selective valve shown in Figure 6, illustrating a second position thereof.

To renew table travel toward the right from this position the operator shifts the hand lever 95 toward the right into the dotted line position of Figure 6, thereby returning the plunger 66 of valve 52 to the position of Figure 10, so as to reconnect pipe 48 with pipe 55 and pipe 56 with return pipe 49, to shift the plunger 87 of valve 75 into the position of Figure 11, and to energize the plunger 50 to thereby increase the flow in pipe 48. Then after the pin 116 has passed over the cam 123′ onto the lower rail 117′ the operator releases the lever 95 and permits the same to reassume its normal relation with lever 106.

Thereafter the table continues to travel at high speed toward the right until the pin 116 engages the cam 119′ and is lifted thereby so as to shift the levers 106 and 95 slightly toward the left. This action causes the plunger 66 of valve 52 to assume the position of Figure 9, so that pipe 51 is again opened to exhaust, the flow in pipes 48 and 55 is again reduced, and cylinder 21 is again connected to the pipe 55 by reason of the return of valve 75 to the position of Figure 6. The table then travels toward the right at a reduced rate, appropriate for a cutting feed. The cam 119′ is so positioned as to effect this reduction in the rate of table movement immediately prior to the engagement of the cutter with a piece of work on the table.

The table continues to travel at this reduced rate until the cutting action on that particular piece of work is completed, at which time the detent 125 strikes the end 131 of the dog 129 and rocks the same into the position of Figure 1. The valve plunger 133 is thus returned into the position of Figure 15, the right end of the bore 149 is again exposed to the pressure in pipe 144, and the piston 134 is actuated to swing the levers 106 and 95 toward the left. This action shifts the pin 116 upwardly against the upper rail 117 and shifts the plunger 66 of valve 52 into the position of Figure 8. Delivery pipe 48 is thus connected with pipe 56, and pipe 55 connected with return pipe 49, to thereby reverse the motor circuit; and plunger 50 is again energized to increase the flow in pipe 48 and to cause valve 75 to again assume the position of Figure 11. The large cylinder 21 is again disconnected from the motor circuit and the table travels toward the left at high speed until the pin 116 is engaged by the cam 123 and depressed into the neutral position shown in Figure 7. This action returns the valve 52 to the position shown in Figure 6 and the table comes to rest.

From the foregoing it will be noted that the detents 125 and 126 serve to automatically reverse the movement of the table, and that by adjusting these detents along the lower rail 117′ the points at which reversal occurs may be varied to best suit the work at hand. It will also be noted that as long as the pin 116 rides against the edge of one or the other of the rails 117 or 117′ the table travels at high speed, but when engaged with one or the other of the cams 119 or 119′ table speed is reduced. The points at which these changes in table speed occur may be readily varied by adjusting these cams lengthwise of the table. Similar cams may be added in the event that a greater number of speed changes are desirable during an operating cycle. It will be further noted that the cams 123 and 123′ serve to bring the table to rest at an intermediate position in both directions of operation. Either or both of these cams may be omitted however if the particular work at hand may best be carried out without thus interrupting the movement of the table.

It will be further noted that the yielding connection 107, between the levers 106 and 95, permits the operator to at any time assume control of table travel, regardless of the position of the lever 106 and its associated pin 116 and table cams. Thus by hand manipulation of the lever 95 the operator may shift the plunger 66 of the control valve 52 into any of the five positions shown in Figures 6 to 10, to thereby change the rate or direction of travel of the table at will.

In the machine shown the lever 95 carries a latch bar 151, rockably supported upon a horizontal pivot pin 152, and provided with an appropriate handle 153. The inner end 154 of the bar 151 projects below a quadrant 155 formed upon the bracket 97. The quadrant 155 contains a notch 156 intermediate the ends thereof into which the end 154 of the rack bar may be entered by depressing the handle 153 of the bar into the dotted line position of Figure 13. When the bar is thus engaged in the notch the lever 95, and consequently the plunger 66 of valve 52, are locked in intermediate position and the milling machine table remains at rest. When the bar is set in the full line position of the figure the lever 95 is free to be swung either by hand or automatically in the manner hereinabove described.

Various changes may be made in the embodiment of the invention hereinabove specifically described without departing from or sacrificing any of the advantages of the invention as defined in the appended claims.

I claim:—

1. In a milling machine the combination of a table, a plurality of hydraulic motors connected in driving relation with said table, a pump mechanism, hydraulic connections between said pump mechanism and motors through which a driving liquid is supplied to said motors at a predetermined rate to drive said table at a predetermined rate, and means for disconnecting one of said motors from said connections to thereby increase the rate of movement of said table in the same direction.

2. In a milling machine the combination of a table, a plurality of pistons and coacting cylinders connected in driving relation with said table, a pump mechanism, hydraulic connections between said pump mechanism and cylinders through which a driving liquid is supplied to said cylinders at a predetermined rate to drive said table at a predetermined rate, and means for disconnecting one of said cylinders from said connections to thereby increase the rate of movement of said table in the same direction.

3. In a machine tool or the like the combination of a driven member, a motor circuit including a hydraulic motor connected in driving relation with said member, a pump circuit including a pump, valve mechanism for connecting said circuits to effect operation of said member in either direction, a second hydraulic motor connected with said member, and means adjustable to by-pass said second motor or to connect the same to said motor circuit.

4. In a machine tool or the like the combination of a driven member, a motor circuit including a hydraulic motor connected to said member, a pump circuit including a pump, valve mechanism controlling communication between said circuits to effect operation of said member in either direction, a second hydraulic motor connected with said member, and a second valve mechanism controlled by said first named valve mechanism, said second valve mechanism being adjustable to by-pass said second motor or to connect the same to said motor circuit.

5. In a machine tool or the like the combination of a driven member, a motor circuit including a hydraulic motor connected with said member, a pump circuit including a variable displacement pump, means for controlling communication between said circuits to effect operation of said member in either direction, means for varying pump displacement to regulate the speed of said member, a second hydraulic motor connected with said member, and means for controlling communication between said second motor and said motor circuit for further varying the speed of said member.

6. In a machine tool or the like the combination of a driven member, a hydraulic motor for driving said member, a variable displacement pump, valve mechanism controlling communication between said pump and motor to effect operation of said member in either direction, a second motor connected with said member, means under the control of said valve mechanism for controlling communication between said second motor and pump, and means controlled by said valve mechanism for varying pump displacement.

7. In a machine tool or the like the combination of a driven member, a plurality of hydraulic motors connected in driving relation therewith, a variable displacement pump a control element, means responsive to movement of said element for controlling communication between said pump and motors selectively to effect operation of said member at different speeds, and means responsive to movement of said element for varying pump displacement.

8. In a machine tool or the like the combination of a driven member, a plurality of hydraulic motors connected with said member, a pump for delivering a driving liquid to said motors, means controlled by said member for reversing the operation of said motors to reverse the motion of said member, and means controlled by said member for controlling communication between said pump and motors to vary the speed of movement of said member at an intermediate point in the path of travel thereof.

9. In a machine tool or the like the combination of a driven member, hydraulically actuated means for driving said member alternately in opposite directions, and means for controlling said fluid actuated means, said last named means comprising spaced cam means carried by said table, a control element, and means automatically operable to maintain said element under the control of one of said cam means during movement of said member in one direction and under the influence of the other of said cam means during movement of said member in the other direction.

10. In a machine tool or the like the combination of a driven member, hydraulically actuated means for driving said member, spaced cams carried by said member, a control element mounted to coact with one of said cams during movement of said member in one direction and to coact with another of said cams during movement of said member in the opposite direction, means controlled by said member for shifting said element into coactive relation with one or the other of said cams selectively, and means controlled by said element for controlling said fluid actuated means.

11. In a machine tool or the like the combination of a driven member, hydraulically actuated means for driving said member, a control element, cam means carried by said member for coaction with said element during movement of said member in one direction, cam means carried by said member for coaction with said element during movement of said member in the opposite direction, means controlled by said member for shifting said element into coacting relation with one or the other of said two last named means selectively, and valve mechanism controlled by said element for controlling said fluid actuated means.

12. In a machine tool or the like the combination of a support having a guideway formed thereon, a table mounted for lengthwise reciprocation in said guideway, a cylinder inserted lengthwise into said support beneath said guideway, means at one end of said support for fixing said cylinder in said support, a deck in said support above said cylinder for retaining said guideway against spreading, a piston in said cylinder, driving connections between said piston and table, and means for supplying a driving liquid to said cylinder.

13. In a machine tool or the like the combination of a support having a guideway, a table mounted for lengthwise reciprocation in said guideway, a pair of superimposed cylinders connected as a unit and lengthwise insertable as a unit into said support beneath said guideway, means for fixing said unit to one end of said support, pistons in said cylinders, driving connections between said pistons and table, and means for supplying a driving liquid to said cylinders to thereby drive said table.

In witness whereof, I hereunto subscribe my name this 10 day of June, 1927.

WALTER FERRIS.